United States Patent [19]

Barley

[11] 4,384,743
[45] May 24, 1983

[54] ADJUSTABLE STOP ASSEMBLY FOR LIMITING THE RECLINE ANGLE OF A SEAT BACK

[75] Inventor: Geoffrey W. Barley, Brookfield, Wis.

[73] Assignee: UOP Inc., Des Plaines, Ill.

[21] Appl. No.: 258,359

[22] Filed: Apr. 28, 1981

[51] Int. Cl.³ ............................................. A47C 1/024
[52] U.S. Cl. .................................... 297/355; 297/365
[58] Field of Search ................ 297/354, 355, 363–371; 16/297, 333, 343, 354

[56] References Cited

U.S. PATENT DOCUMENTS

| 1,654,726 | 1/1928 | Graham | 297/363 X |
| 3,343,206 | 9/1967 | Mannerheimo | 297/363 X |
| 3,635,525 | 1/1972 | Magyar | 297/364 X |

FOREIGN PATENT DOCUMENTS

| 2346073 | 4/1974 | Fed. Rep. of Germany | 297/355 |
| 814690 | 6/1959 | United Kingdom | 297/354 |

Primary Examiner—William E. Lyddane
Attorney, Agent, or Firm—James R. Hoatson, Jr.; Barry L. Clark; William H. Page, II

[57] ABSTRACT

A contact surface on a toothed segment member which controls the recline position of a seat back is abutted by one or the other of a pair of contact surfaces on a stop element to limit the recline angle of the seat back. An off-center threaded opening in the stop element is adapted to receive a bolt passed through a selected one of a plurality of adjacent openings in a bracket on the seat frame. Thus, by turning the stop element over, it is possible to provide a number of discrete stop positions equal to double the number of adjacent openings in the bracket. Cooperating curved surfaces on the bracket and stop element having their center of curvature on the axis of the seat back support shaft assist in installation and ensure that the abutting contact surfaces can fully engage each other at any angle of adjustment.

3 Claims, 4 Drawing Figures

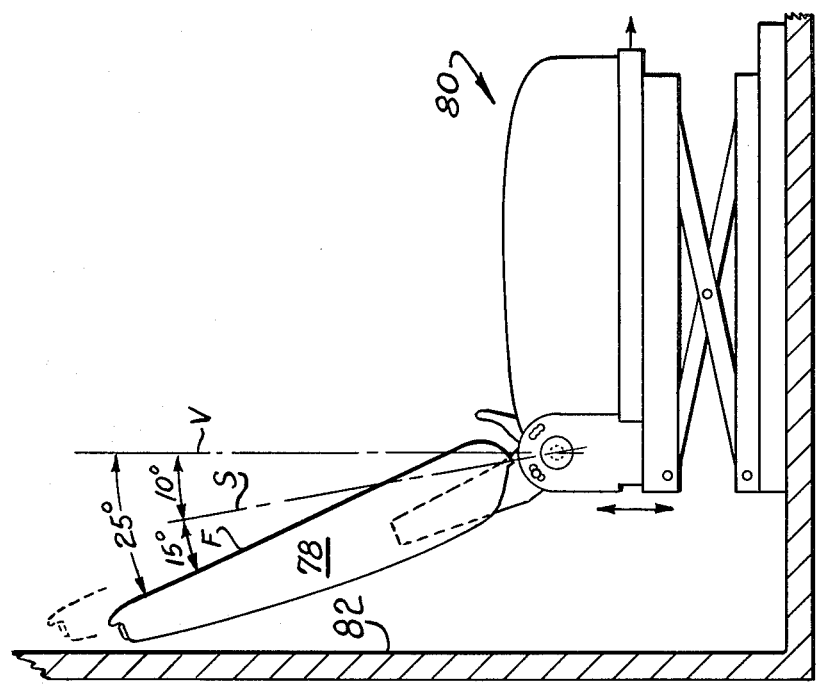
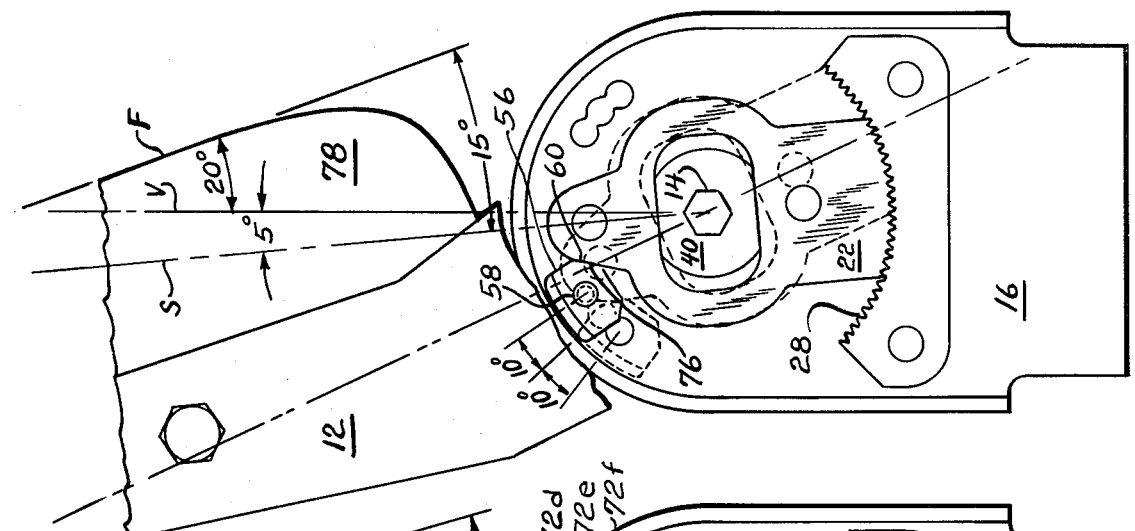
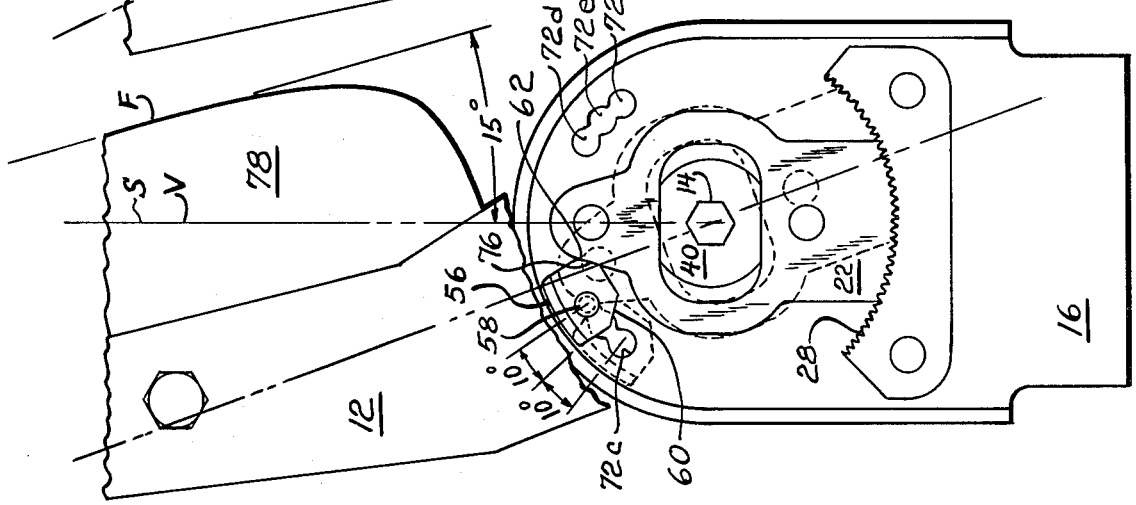

4,384,743

ADJUSTABLE STOP ASSEMBLY FOR LIMITING THE RECLINE ANGLE OF A SEAT BACK

BACKGROUND OF THE INVENTION

The invention relates to vehicle seats and particularly to seats which have a reclining seat back. An example of such a seat is shown in my co-pending patent application Ser. No. 244,514, filed Mar. 16, 1981, and entitled, "Seat Reclining Mechanism", the disclosure of which is incorporated by reference herein.

Although certain reclining mechanisms permit a rather wide range of adjustment of the angle of recline, there are certain situations where one might wish to limit the maximum angle of recline. For example, manufacturers of suspension seats commonly produce a variety of seat models which have characteristics suitable for various uses such as heavy trucks, off-the-road vehicles, and agricultural tractors, to name a few. The seats which are suitable for heavy trucks, for example, should preferably be constructed so as to provide, at a reasonable cost, the type of vibration isolation and freedom from maintenance desired by most vehicle manufacturers. The cost can best be minimized by designing the same seat to fit all vehicles. However, a wide variation in the interior dimensions of the cabs of various vehicles produced by different manufacturers, and often by the same manufacturer, makes this task difficult, if not impossible. For example, one cab might have sufficient space behind the driver's seat to accommodate a seat back reclined to a 40° angle, while another might produce interference at a 20° angle. The seat back must be spaced from the back wall to accommodate the free vertical movement of the seat suspension without rubbing, since rubbing would not only cause rapid destruction of the seat back, but would greatly reduce the ability of the suspension to isolate vibrations. Where fixed means are used to limit or stop the maximum recline angle, it is often necessary for a vehicle manufacturer to purchase some seats having one limit position and others with other limit positions. Alternatively, the vehicle manufacturer might prefer to weld the stop element in position as part of his operation. Obviously, the maximum recline angle a vehicle manufacturer can allow is one where the rear cab wall will be cleared with the seat at the maximum rearward setting of the fore and aft adjustment mechanism. However, where a seat is always to be occupied by a person who prefers a forward seat position, a permanently fixed rear stop position of the seat recliner will waste space that could be used for a greater angle of recline.

SUMMARY OF THE INVENTION

It is among the objects of the present invention to provide an adjustable stop assembly which will overcome the aforementioned problems and yet be simple in construction and easy to assemble and adjust by either the vehicle manufacturer or the seat occupant.

These and other objects of the present invention are attained by the stop assembly disclosed herein which is generally described in the abstract and in more detail in connection with the various drawings attached hereto.

BRIEF DESCRIPTION OF THE DRAWINGS

FIG. 2 is an axial view taken on line 2—2 of FIG. 1 with the recliner actuating cam removed and portions of a seat back support arm and a seat back cushion added for clarity;

FIG. 3 is similar to FIG. 2, but shows the change in seat back angle permitted by turning the stop element end for end; and FIG. 4 is a side view showing the relationship of a seat to the floor and rear wall of a vehicle cab.

DESCRIPTION OF THE PREFERRED EMBODIMENT

Figure 1:
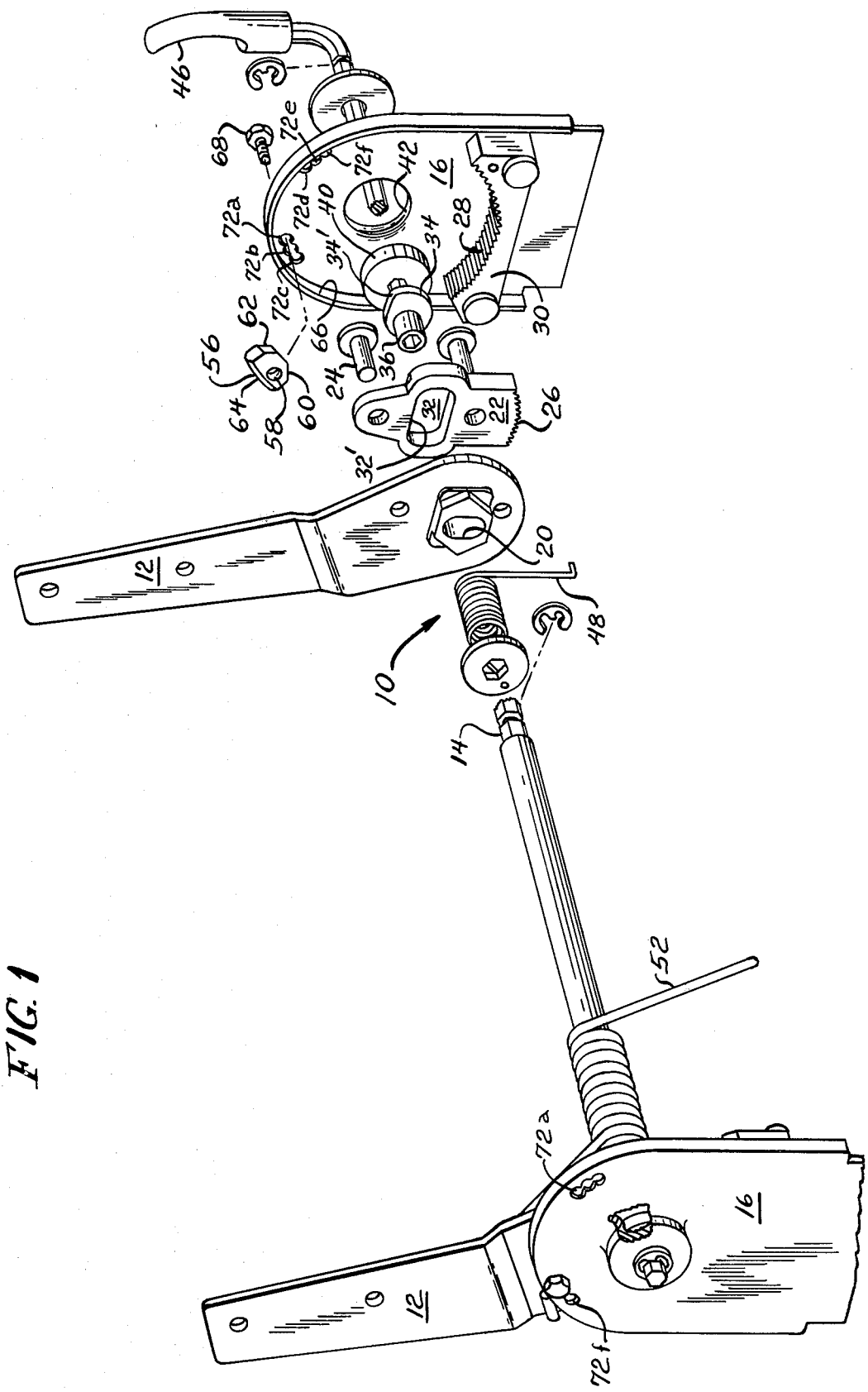
FIG. 1 is a partially exploded isometric view showing the relationship of my adjustable stop assembly to a pair of pivoted seat back support arms and to an adjustable reclining mechanism affixed to the support arms and to the seat frame.

Referring to FIG. 1, a seat back mounting assembly is indicated generally at 10 and broadly comprises a pair of support arms 12 which may be pivotally reclined about the axis of shaft 14 which is supported on brackets 16 carried by the frame (not shown) of the seat. The reclining mechanism is described in great detail in the aforementioned co-pending application and includes a vertically slotted element 20 welded to the arms 12 and a horizontally slotted sector element 22 which is also fixed to the arms 12, such as by rivets 24. The support arms 12 may be held in any one of a large number of selected angular positions, depending upon the relative angular positions of the toothed portion 26 of the movable sector member 22 and the complementary, toothed portion 28 of the fixed member 30 carried by the bracket 16. When adjustment of the angle of seat back recline is desired, the toothed portion 26 is lifted out of engagement with the toothed portion 28 by applying a lifting force to the upper surface 32' of the horizontal slot 32 by means of an upper cam portion 34' of the cam member 34. The cam member 34 is preferably integrally formed with a cylindrical portion 36 which is adapted to ride vertically within the vertical slot in the element 20. The interior of the cam 34 is preferably hexagonally shaped so as to provide a keyed relation with the hexagonal support shaft 14. A cylindrical bearing member 40, which may be formed either separately from or integrally with the cam member 34, is positioned immediately outboard of the cam member 34 and supports the shaft 14 within a flanged portion 42 of the bracket 16. The end portion of the shaft member 14 is preferably bent to a right angle position and covered with a handle member 46 so as to facilitate manual rotation of the shaft 14. A cam return spring 48 normally biases the cam member 34 in a clockwise direction (as viewed in FIG. 1) so that the cam's lower surface engages the lower surface of the slot 32 so as to force the teeth 26 of the movable sector into locking contact with the teeth 28 of the fixed sector 30. When reclining adjustment of the seat back is desired, the handle 46 is moved slightly counterclockwise (as viewed in FIG. 1) so as to cause the cam portion 34' to lift the surface 32' to disengage the teeth 26, 28 and permit free movement of the seat back by applying manual pressure to it against the forward biasing force applied to it by the seat back return spring 52.

In order to limit rearward movement of the seat back, such as for reasons previously discussed, a stop element 56 is provided. The stop element 56 includes a threaded opening 58 which is shown in FIGS. 1 and 2 as being closer to the trailing end stop portion 60 than it is to the leading end stop portion 62. The stop element also includes a curved upper edge portion 64 which is adapted to mate with the curved flange portion 66 of the bracket 16. Each of these elements has its center of curvature at the center of the opening defined by flange portion 42. This center of curvature is also the axis of the shaft 14. The stop element 56 is adapted to be held against the vertical inner surface of the bracket 16 by a bolt member 68 which is passed through an opening in the bracket and engages the threaded opening 58 so that element 56 performs the function of a nut. The bolt 68, depending upon the maximum angle of recline of the seat back which is required, may be mounted in any one of the openings 72a, 72b, or 72c. These openings are preferably closely positioned to each other as shown, with the center of each opening being on the locus of a circle having its center on the axis of shaft 14. Thus, the curved surface 64 will always engage the curved inside flange surface 66 of the bracket so that no rotation of the element 56 can take place and so that no tools will be required to hold the element 56 while the bolt 68 is being inserted into it. The forwardly positioned set of holes 72d, 72e and 72f serve no purpose on the bracket 16 as it is used on the right side of FIG. 1. However, by forming these holes in the bracket member, the identical bracket member can be used at either end of the seat as can be seen at the left side of FIG. 1 wherein hole 72f corresponds to hole 72c on the bracket to the right side of FIG. 1.

It can be seen in FIG. 1 and FIG. 2 that, depending upon wich of the three holes 72a, 72b, or 72c the bolt 68 is placed in, the leading end stop portion 62 will be located in one of three stop locations relative to a complementary contact surface 76 on the sector element 22. If the holes are positioned 10° apart, as shown in FIG. 2, it is obvious that the front surface "F" of the seat back cushion 78 can be positioned at various angles of recline of 15°, 25° or 35° depending upon which opening the bolt 68 is passed through. The maximum recline angle in FIG. 2 would be 35° when the stop element 56 is in its dotted line rear position with the bolt 68 positioned in hole 72c.

Referring to FIG. 3, it can be seen that the stop element 56 has been turned end for end so that the trailing end stop portion 60, which is inoperative in FIG. 2, becomes the leading end stop portion in FIG. 3. By locating the threaded opening 58 closer to the rear end of the stop element than to the front end in FIG. 2 by an amount equal to one-half the distance between an adjacent pair of the openings 72a, 72b and 72c, the stop portion 60 in FIG. 3 will be positioned at a location which, for any bolt position, is 5° different from the location of stop portion 62 in FIG. 2. Thus, the forward surface "F" of the seat back cushion 78 in FIG. 3 will be located 20° from the vertical when the bolt 68 is in hole 72a, 30° when it is in hole 72b, and 40° when it is in hole 72c. Support arm 12 and seat back cushion 78 can move to their reclined position as permitted by contact of the contact surface 76 which is affixed to the arm with the leading edge portion of the stop element 56. Thus, in the forwardmost position, or the position of least recline, shown as 15° in FIG. 2, the line "S" through the attachment points of the moving sector element 22 to the arm 12 will be vertical and coincident with the vertical line "V" through the axis of shaft 12. When the cushion surface "F" is reclined to 20°, as in FIG. 3, the sector line "S" will move 5° from the vertical line "V". Similarly, by progressively turning the element 56 end for end or shifting the bolt 68 to the rearward holes 72b and 72c, the recline angle can be varied in 5° increments.

FIG. 4 illustrates that for one particular configuration of a cab, the location of the rear wall 82 dictates that a recline angle of the cushion surface "F" of only 25° could be permitted when the seat 80 is in its rearmost adjusted position. Some small clearance would be necessary, as indicated, so that vertical movement of the seat suspension as the seat back 78 moves between its solid and dotted line positions will never permit the seat back to rub on the cab wall. However, where the particular seat is generally to be used by a particular occupant who would position the seat forwardly of the position shown, it is obvious that a greater angle of recline than 25° could be permitted before the seat back 78 would rub on the rear cab wall 82. By the present invention, such occupant could easily readjust the limit stop to permit a greater angle of recline.

I claim as my invention:

1. An adjustable stop means for providing a multiplicity of limit stop positions to a reclining seat back support member which is mounted for selective pivotal movement relative to a pair of axially spaced frame members located immediately adjacent opposite sides of the bottom cushion of a seat assembly, at least one of said frame members having at least one set of circular, closely adjacent, uniformly spaced openings therein which are positioned with their centers on a circle having its center on the pivot axis of the support member, said at least one frame member further having a flange portion thereon which is radially outwardly of said circular openings and has a curved inner peripheral contact surface which is on a circle having its center on the pivot axis of the support member; a threaded fastener; a stop element having a threaded aperture therein for receiving said threaded fastener passed through said at least one frame member in any selected one of said at least one set of circular openings, said stop element having a curved outer peripheral surface which is complemental to said curved inner contact surface on said flange portion and immediately proximate thereto in any position of adjustment of said stop element relative to said flange portion, the stop element having a pair of inwardly converging edge portions, said edge portions being of an angle to provide complemental full surface contact with an edge of an angled stop portion carried by said reclining seat back support member, said threaded aperture in said stop element being closer to one of said pair of converging edge portions than it is to the other.

2. An adjustable stop means according to claim 1 wherein said threaded aperture in said stop element is closer to one of said edge portions than it is to the other by a distance equal to about one-half of the distance between any adjacent pair of said at least one set of circular openings, whereby the number of limit stop positions which can be provided for said seat back member can be double the number of openings in said at least one set by turning said stop element end for end.

3. An adjustable stop means according to claim 2 wherein said frame members each have two sets of openings therein, one set being to the rear of a vertical center line and the other set being forward of said center line whereby the same frame member can be used interchangeably for either side of a seat, the threaded fastener being mounted only in the rear set of openings.

* * * * *